Aug. 12, 1930.          C. F. HEALY                 1,773,041
                         TOOTHBRUSH
                      Filed April 16, 1927
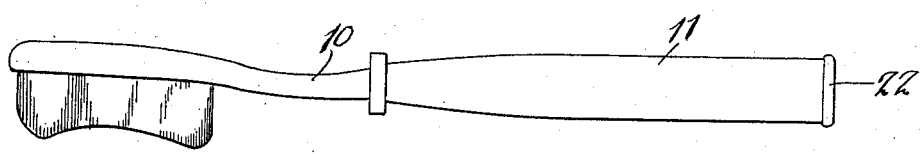
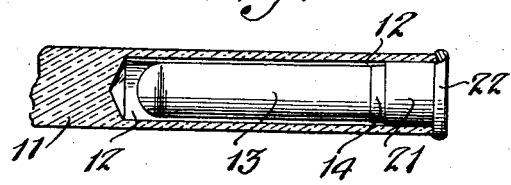
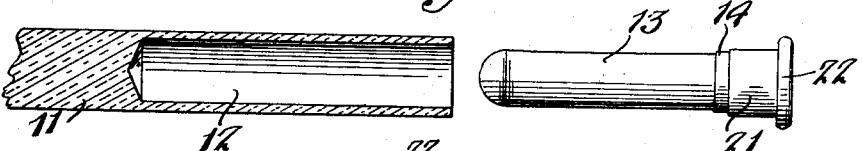
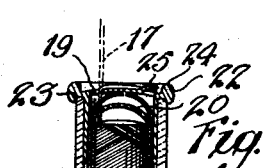
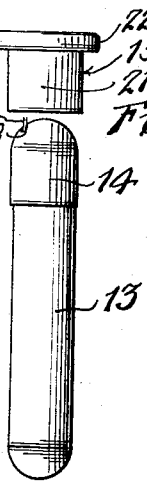
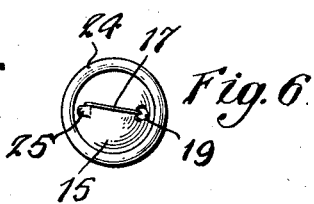
Charles F. Healy
  Inventor
By Wm. L. Symons
            his Attorney Patented Aug. 12, 1930

1,773,041

UNITED STATES PATENT OFFICE

CHARLES F. HEALY, OF NEW YORK, N. Y.

TOOTHBRUSH

Application filed April 16, 1927. Serial No. 184,369.

My invention relates to improvements in tooth brushes and more especially to a tooth brush in the handle of which a roll of dental floss is carried.

An important object of my invention is to provide a device of the character described with a removable and replaceable dental floss container.

Another object of my invention is the provision of a device of the above mentioned character having a dental floss container adapted to be frictionally held in place within the tooth brush handle.

A further object of my invention is to provide a device of this character in which a refill may be placed without the usual threading of the floss.

Still another object of my invention is the provision of a device of the character described having a moisture proof container for the dental floss.

Other objects and advantages of my invention will be apparent during the course of the following description.

In the accompanying drawings, which form part of this specification and wherein like characters of reference denote like or corresponding parts throughout the same, Figure 1 is a side elevation of a tooth brush embodying my invention, Figure 2 is a fragmentary sectional view thereof, Figure 3 is a similar view showing the dental floss container or refill removed, Figure 4 is a longitudinal sectional view of the end of the tooth brush handle and of the dental floss receptacle, Figure 5 is an elevation of the dental floss receptacle showing the cap removed, and, Figure 6 is a plan view of the cap.

In the accompanying drawings wherein for the purpose of illustration is shown a preferred embodiment of my invention, the numeral 10 designates a tooth brush having a handle 11 with a well or elongated cavity 12 in its end.

A capsule or container 13 of celluloid or similar water-proof material, is formed with a short end section 14 adapted to be received and frictionally held in a cap 15. A roll of dental floss 16 is arranged within the capsule and its free end 17 extends through a small opening 18 in the end of the short section 14, and out through an opening 19 in the cap 15. A water-proof disk 20 of cork or the like is arranged within the capsule section 14 and has a slit through which the end 17 passes.

The outer circumference of the cap body at 21 is sufficient to cause a tight fit with the inner wall of the well 12, and is adapted to be frictionally held therein. The rim 22 of the cap is provided with a groove or depression 23 to receive the end of the brush handle to form a moisture proof joint and the rim 22 is provided with a raised circumferential bead or flange 24. A cutter element 25 is struck up from the end of the cap 15, but does not project beyond the bead or flange 24.

It will be seen that the floss container may be readily removed or replaced in the tooth brush, and that the container may be sold as a whole, including the cap. The user need only discard the empty container, cap and all, and insert a new container with a single movement, without the necessity of threading the floss through openings or the like. The depression 23 serves to seal the well 12 and moisture is kept out of the capsule by means of the disk 20.

The frictional fit of the cap 15 in the well 12 not only renders easy the insertion and removing of the container, but also affords a dependable securing means for the cap and one which does not tend to work loose as in the case of threads or the like. This construction is also more sanitary than the usual threads and is easier to clean and keep cleaned.

While I have shown and described the preferred embodiment of my invention, it is to be understood that various changes in the size and arrangement of parts may be resorted to without departing from the spirit of my invention or the scope of the subjoined claims.

Having thus described my invention, what I claim and desire to protect by Letter Patent is:

1. A tooth brush having a handle with an open well in its end, a capsule adapted to receive a spool of dental floss, means carried by said capsule to frictionally engage the walls of the well and seal the open end thereof and means whereby the floss within said container may be withdrawn for use while the container is in place in the well.

2. A tooth brush having a handle with an open well therein, a capsule containing a spool of dental floss and adapted to be received in the well, a moisture proof member in said capsule, a cap carried by said capsule and adapted to frictionally engage the well, and having a groove adapted for the reception of the end of the handle of the tooth brush and adapted to form a moisture-proof joint therewith.

3. A tooth brush having a handle with a well therein, a cap adapted to carry a dental floss container to be received in said well, said cap having an opening through which the dental floss may pass and having a cutter under which the end of the floss may be secured, the wall of the cap being bulged outwardly to facilitate grasping of the end of the dental floss, and a raised circumferential bead arranged on said cap and extending beyond the cutter.

4. A tooth brush having a handle with a well in its end, a cap carried by a capsule containing a spool of dental floss, and adapted to frictionally engage the inner wall of the well, said cap having a rim with a depression therein to receive the end of the brush handle, the end wall of the cap being bulged outwardly and provided with a cutter and an opening for the end of the dental floss, and a raised bead on the rim of the cap, surrounding the cutter and opening, and projecting beyond the cutter.

5. A toothbrush having a handle with an open well therein, a container having a spool of dental floss therein, said container being adapted to be received in said well, a cap carried by said container and adapted to frictionally engage the well and seal the open end thereof and means whereby the floss within said container may be withdrawn for use while the container is in place in the well.

6. A toothbrush having a handle with an open well therein, a dental floss unit comprising a container and a cap therefor and adapted to receive the end of the container, said dental floss unit being adapted to be received in the well in the handle and frictionally engage the walls thereof to retain the dental floss unit in the well and seal the open end of said well and means whereby the floss within said container may be withdrawn for use while the container is in place in the well.

In testimony whereof I affix my signature.

CHARLES F. HEALY.